(12) United States Patent
Tamminen et al.

(10) Patent No.: US 7,711,257 B2
(45) Date of Patent: May 4, 2010

(54) IMAGE QUALITY IN CAMERAS USING FLASH

(75) Inventors: Janne Tamminen, Tampere (FI); Mikko Perälä, Kangasala (FI)

(73) Assignee: Nokia Corporation, Espoo (FI)

( * ) Notice: Subject to any disclaimer, the term of this patent is extended or adjusted under 35 U.S.C. 154(b) by 893 days.

(21) Appl. No.: 11/410,523

(22) Filed: Apr. 24, 2006

(65) Prior Publication Data

US 2007/0248342 A1 Oct. 25, 2007

(51) Int. Cl.
*G03B 7/00* (2006.01)
(52) U.S. Cl. .................. 396/67; 396/155; 396/225; 348/366; 348/371
(58) Field of Classification Search .................. 396/157, 396/67, 155, 225; 348/370, 371, 227.1, 366
See application file for complete search history.

(56) References Cited

U.S. PATENT DOCUMENTS

| | | | |
|---|---|---|---|
| 4,291,979 A * | 9/1981 | Yuasa et al. ................ 356/218 |
| 4,494,850 A | 1/1985 | Katsuma et al. | |
| 5,017,955 A | 5/1991 | Kotani | |
| 5,406,348 A | 4/1995 | Wheeler | |
| 5,649,238 A | 7/1997 | Wakabayashi et al. | |
| 5,752,101 A | 5/1998 | Akamatsu et al. | |
| 6,075,562 A * | 6/2000 | Sakaguchi et al. ........ 348/223.1 |
| 6,272,292 B1 * | 8/2001 | Iwasaki et al. .............. 396/157 |
| 6,564,014 B1 * | 5/2003 | Takeuchi et al. ............ 396/157 |
| 2003/0068165 A1 * | 4/2003 | Hirai et al. ................... 396/157 |
| 2004/0109082 A1 * | 6/2004 | Yokonuma ................... 348/371 |
| 2004/0196643 A1 | 10/2004 | Terada et al. | |
| 2005/0046739 A1 * | 3/2005 | Voss et al. ................... 348/371 |
| 2005/0134723 A1 | 6/2005 | Lee et al. | |
| 2005/0140822 A1 * | 6/2005 | Ichikawa .................... 348/370 |
| 2005/0147404 A1 * | 7/2005 | Takeuchi ..................... 396/157 |
| 2007/0201853 A1 * | 8/2007 | Petschnigg .................. 396/155 |
| 2008/0165265 A1 * | 7/2008 | Chiba et al. ................. 348/308 |

* cited by examiner

*Primary Examiner*—Christopher Mahoney

(57) ABSTRACT

The specification and drawings present a new method, apparatus and software product for using a flash light with, e.g., light-emitting diodes (LEDs) or other light sources of a camera of an electronic device for improving quality of images provided by the camera. The flash related parameters comprising a white balance setting and/or exposure settings can be determined using, e.g., an ambient light level and an estimate of the flash light reflected from said object.

23 Claims, 2 Drawing Sheets

IMAGE QUALITY IN CAMERAS USING FLASH

TECHNICAL FIELD

The present invention relates generally to electronic devices comprising cameras and, more specifically, to using flash (e.g., comprising LEDs) for improving quality of images provided by the camera.

BACKGROUND ART

When a camera is taking an image with LED flash the illumination of an object is most often a mix of a flash and an ambient light. Colors of the image captured by the camera are affected by ambient light type (fluorescent, incandescence, etc.), but also by the level of the ambient light compared to the flash light. The amount of reflected flash light from the object back to the camera depends mostly on flash efficiency, object reflectance and especially on a distance from the object to the flash, because the luminance follows inverse square law: it varies in inverse proportion to the square of distance.

Furthermore, the characteristics of images acquired by the camera depend on the spectral content (or the color temperature) of the light. When the spectral content of the flash is fixed, the desired image characteristics can be achieved by mounting color filters on the lens of the camera. However, this provides only limited control of image characteristics because the filters do not provide continuous control of the spectral content of the light received by the camera. In addition, the filters are inconvenient to use because to achieve different spectral filtering, the filters must be physically interchanged.

In case of some LED flashes, it is possible to turn the flash on for such a long time that camera AE (Auto Exposure) and AWB (Auto White Balance) control can adjust the exposure and color compensation gains to an optimum. The problems with that are increased power consumption, shortened lifetime of LED flash (result of heating) and longer delay between user's shutter-key press and actual image capturing. Also, most humans do not feel comfortable when a very bright light is pointing to their eyes, for example, for half a second.

Also, some cameras try "to guess" the best exposure and white balance settings before the flash is fired so that flash power consumption and capture delays are minimized. The problem is that it is difficult to calculate the settings if the distance and reflectance of the target object are not known.

DISCLOSURE OF THE INVENTION

According to a first aspect of the invention, a method for using a flash of a camera adopted for providing images in an electronic device, comprises: calculating an ambient light level; calculating an estimate of a flash light reflected from an object to be captured by the camera; determining, using the ambient light level and the estimate of the flash light reflected from the object, at least one of the following parameters: a) color compensation gains for a color compensation of an image of the object taken with the flash, b) an exposure time of the image taken with the flash, and c) a gain for the image taken with the flash; and taking or processing the image of the object by the camera with the flash using at least one of the determined parameters.

According further to the first aspect of the invention, the ambient light level may be calculated using a light level measured by a sensor of the camera, the sensor is used for providing the image of the object.

According further to the first aspect of the invention, the estimate of the flash light reflected from the object may be calculated using at least one of: a) an optical reflectance of the object, b) a distance from the object to the flash, and c) stored values of a flash luminance at pre-selected distances from the electronic device to the object. Further, the optical reflectance may be a predetermined value substantially equal to 18%. Still further, the optical reflectance may be measured using a further light level measured by a sensor of the camera, wherein the further light level measured by the sensor comprises the ambient light level and an assistance light level which is provided by the flash to perform an auto-focusing procedure by the camera.

Still further according to the first aspect of the invention, the color compensation gains may be determined using at least one of: a) an optimized color compensation gain for a particular color of the flash light without an ambient light, and b) an optimized color compensation gain for a particular color calculated by a camera auto white balance algorithm for the ambient light without the flash light.

According further to the first aspect of the invention, the exposure time of the flash may be determined using at least one of: a) a selected gain for the image taken with the flash, and b) a target exposure level.

According still further to the first aspect of the invention, the determined parameters may comprise both the color compensation gains for the color compensation of the image of the object taken with the flash and the exposure time of the image taken with the flash.

According to a second aspect of the invention, a computer program product may comprise: a computer readable storage structure embodying computer program code thereon for execution by a computer processor with the computer program code characterized in that it includes instructions for performing the steps of the first aspect of the invention, indicated as being performed by any component or a combination of components of the electronic device.

According to a third aspect of the invention, an electronic device, comprises a camera adapted for using a flash for providing images, the camera comprises: a flash control generating block, configured to calculate an ambient light level, configured to calculate an estimate of a flash light reflected from an object to be captured by the camera, and configured to determine, using the ambient light level and the estimate of the flash light reflected from the object, at least one of the following parameters: a) color compensation gains for a color compensation of an image of the object taken with the flash, and b) an exposure time of the image taken with the flash, and c) a gain for the image taken with the flash; and a flash, configured to provide a flash light during taking the image.

Further according to the third aspect of the invention, the camera may be digital.

Still further according to the third aspect of the invention, the flash control generating block may be configured to calculate the ambient light level using a light level measured by a sensor of the camera, and the sensor may be configured to provide the image of the object.

According further to the third aspect of the invention, the flash control generating block may be configured to calculate the estimate of the flash light reflected from the object using at least one of: a) an optical reflectance of the object, b) a distance from the object to the flash, and c) stored values of a measured flash light reflected from the object for the pre-selected distance between the electronic device and the object. Further, the optical reflectance may be a predetermined value substantially equal to 18%. Still further, the electronic device may be configured to measure the optical reflectance using a further light level measured by a sensor of the camera, wherein the further light level measured by the sensor comprises the ambient light level and an assistance light level which is provided by the flash to perform an auto-focusing procedure by the camera.

According still further to the third aspect of the invention, the flash control generating block may be configured to determine the color compensation gains of the flash using at least one of: a) an optimized color compensation gain for a particular color of the flash light without an ambient light, and b) an ambient light gain for a particular color calculated by a camera auto white balance algorithm for the ambient light without the flash light.

According yet further still to the third aspect of the invention, the flash control generating block may be configured to determine the exposure time of the flash using at least one of: a) a selected flash gain, and b) a target exposure level.

According further still to the third aspect of the invention, the flash may comprise at least one light emitting diode.

Yet still further according to the third aspect of the invention, the flash may comprise multiple light emitting diodes of more than one color.

Still yet further according to the third aspect of the invention, the electronic device may be a camera, a wireless communication device, a mobile phone, a camera-phone mobile device or a portable electronic device.

Still further still according to the third aspect of the invention, the electronic device may further comprise: an image correction block, configured to compensate the color of the image of the object taken with the flash using the color compensation gains thus providing a corrected video signal.

Yet still further according to the third aspect of the invention, the determined parameters may comprise both the color compensation gains for the color compensation of the image of the object taken with the flash and the exposure time of the image taken with the flash.

According to a fourth aspect of the invention, an electronic device, comprises a camera adapted to using a flash for providing images, said camera comprises: means for calculating an ambient light level; means for calculating an estimate of a flash light reflected from an object to be captured by the camera; means for determining, using the ambient light level and the estimate of the flash light reflected from the object, at least one of the following parameters: a) color compensation gains for a color compensation of an image of the object taken with the flash, b) an exposure time of the image taken with the flash, and c) a gain for the image taken with the flash; and means for taking or processing the image of the object by the camera with the flash using at least one of the determined parameters.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
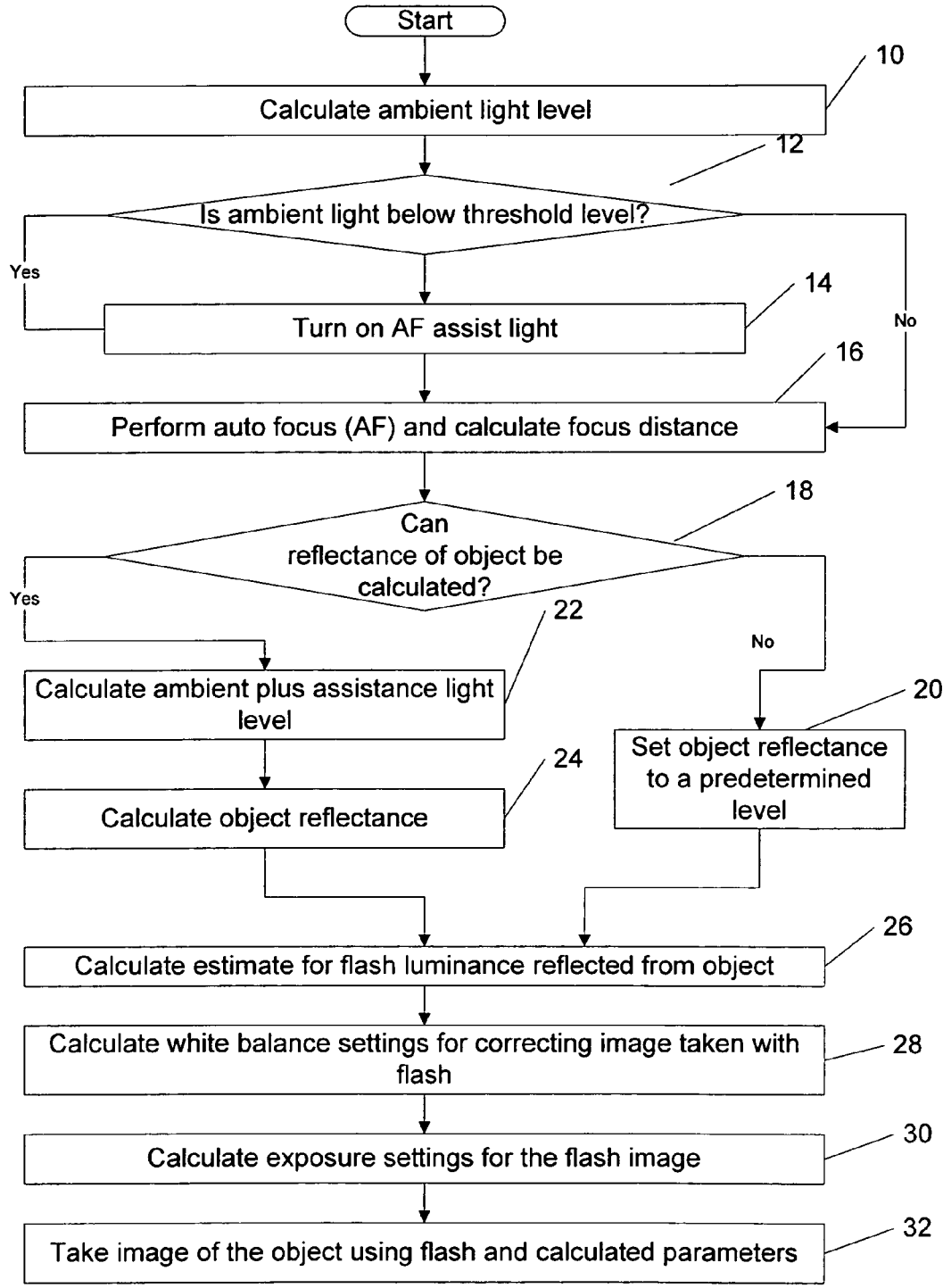
FIG. 1 is a flow chart of a method for using a flash (e.g., comprising multiple color LEDs) for improving quality of images provided by the camera, according to an embodiment of the present invention.

A new method, apparatus and software product for using a flash light with, e.g., light-emitting diodes (LEDs) or other light sources of a camera of an electronic device for improving quality of images provided by the camera. The electronic device can be, but is not limited to, a camera, a wireless communication device, a mobile phone, a camera-phone mobile device, a portable electronic device, non-portable electronic device, etc. The camera can have digital and/or analog processing.

According to an embodiment of the present invention, the flash related parameters, comprising a white balance setting for a color correction/compensation of an image of an object taken with the flash and/or an exposure time for the flash, can be determined using, e.g., an ambient light level and an estimate of the flash light reflected from said object. Then the image of the object taken by the camera with the flash using at least one of the determined flash related parameters will have improved quality.

Moreover, according to a further embodiment of the present invention, the ambient light level may be calculated, e.g., using a light level measured by a sensor of the camera, wherein that sensor may be used for providing the image of the object (thus no additional sensor is necessary). Furthermore, the estimate of the flash light reflected from the object may be calculated, e.g., using an optical reflectance of the object, a distance from the object to the flash, and/or stored values of a measured flash light luminance at pre-selected distances between the electronic device and the object.

The optical reflectance may be estimated, e.g., using a further light level measured by a sensor of said camera, wherein this further light level comprises the ambient light level and an assistance light level which is provided by the flash to perform an auto-focusing procedure by the camera. In case there is not enough feedback (e.g., the object is not in a macro range) to calculate the optical reflectance, a general "gray" level of 18% reflectance may be used.

According to an embodiment of the present invention, the white balance setting for the color correction/compensation of an image of an object taken with the flash may be determined, e.g., using: an optimized color compensation gain for a particular color of the flash light without an ambient light and/or an optimized color compensation gain for a particular color calculated by a camera auto white balance algorithm for the ambient light without the flash light. Furthermore, the exposure time of the image taken with the flash may be determined, e.g., using a selected gain for the image taken with the flash and a target exposure level. Alternatively, the flash gain for the image taken with the flash may be determined, e.g., using a selected exposure time of the image taken with the flash and a target exposure level.

According to a further embodiment of the present invention, the flash may comprise one or more light-emitting diodes (LEDs) and more specifically multiple light emitting diodes of more than one color.

According to an embodiment of the present invention, an estimate for the distance between camera and an object can be obtained in the camera, for example comprising auto focus (AF), by calculating the focus distance based on the camera lens position. The AF assist light can be utilized then to get the estimate for the reflection characteristics of the object. Moreover, the camera sensor can be used to measure the luminance at the area of interest. Then it is possible to estimate the object luminance with a flash light when the object distance and reflectance are known. The images taken with LED flash quality using the calculated parameters (e.g., exposure time of the image taken with the flash and/or optimized color compensation gains) will be improved especially at problematic close-up or macro-range, because of better exposure time and/or white balance settings estimate.

FIG. 1 shows a flow chart of a method for using a flash (e.g., comprising multiple color LEDs) for improving quality of images provided by the camera, according to an embodiment of the present invention.

The flow chart of FIG. 1 only represents one possible scenario among others. Also the order of steps shown in FIG. 1 is not absolutely required, so in principle, the various steps can be performed out of order. In a method according to the first embodiment of the present invention, in a first step 10, the ambient light level is calculated. This step may be performed, for example, by calculating an average ambient light luminance received by the camera through a lens using, e.g., the latest viewfinder exposure time, gains and AE (auto exposure) statistics, as follows:

$$E\_ambient = A*AE\_current/(ES*G) \quad (1),$$

wherein AE_current is a current exposure level (e.g., an average pixel value), ES is an exposure time and G is a gain (generally, analog plus digital) on the area of interest and A is a constant (related to a camera sensitivity). AE_current may be an average of all pixel values after vignetting correction on the area of interest (for example, the area of interest can depend on the scene, e.g., in "portrait" mode exposure typically is center weighted). Also the area of interest can take into consideration a digital zoom factor. Thus, the area of interest and the exposure mode (center weighted, etc.) can be taken into account, when camera sensor is used to measure the light level such that no additional light sensor is needed.

In a next step 12, it is ascertained whether the ambient light is below a predetermined threshold level. If that is not the case, the process goes to step 16. If, however, it is ascertained that the ambient light is below the predetermined threshold level, in a next step 14, an AF light is turned on. For example, some LED flash drivers support lower current mode and flash could be used as an assist light for the AF procedure. If ambient light level (E_ambient) is below the threshold level, the AF assist light will be turned on before focusing starts.

In a next step 16, the auto focus (AF) is performed and a focus distance (D_obj) is calculated. AF can be performed using a procedure well known in the art, which is followed by calculating a distance D_obj (or the focus distance) to the object based on a lens position. Especially, at the close-up range wherein the depth of field is small, the focus distance provides a good estimate for the distance between the object and the flash.

In a next step 18, it is ascertained whether the object reflectance can be calculated. Typically, this calculation can be performed if the object is at the macro range, if there is enough feedback signal reflected from the object and/or if there is a support assist functionality available in the camera. If it is determined that the object reflectance cannot be calculated for at least one of the above reasons, in a next step 20, the object reflectance is set to a predetermined level: a general "gray" level of 18% reflectance may be used. If, however, it is ascertained that the object reflectance can be calculated, in a next step 22, the assistance plus ambient light level is calculated first, e.g., using Equation 1 (E_assiston instead of E_ambient) with the latest viewfinder settings and AE statistics information. Then in a next step 24, the object reflectance can be calculated using knowledge of the luminance of the assistant plus light at some distance, the current ambient light level and the distance to the object D_obj, as follows:

$$R = (E\_assist\_on - E\_ambient)/E\_a\_obj = (E\_assiston - E\_ambient)/[(D\_a\_ref/D\_obj)^2 * E\_a\_ref] \quad (2),$$

wherein E_a_ref is a measured flash luminance at a distance D_a_ref in the assist light mode (e.g., the electronic device can store values of a a flash luminance at preselected distances from the electronic device to the object), and E_a_obj is a luminance provided by the assist light on the object at a distance D_obj; E_a_obj is given by E_a_obj=(E_a_ref*D_a_ref^2)/D_obj^2.

In a next step 26, an estimate for the flash luminance reflected from the object to the camera can be calculated as follows:

$$E\_flash = R*B*E\_ref*(D\_ref/D\_obj)^2 \quad (3),$$

wherein R is the earlier calculated estimate for the object reflectance using Equation 2 or the predetermined level of reflection (e.g., 18%), B is a constant which compensates flash "on" time vs. exposure time (for example, B=0.5 in case the flash light is "on" half of the exposure time), D_obj is the distance between the flash (or the electronic device) and the object.

It is noted, that after step 26, optionally, a decision can be made if the flash is needed to be used if there is any benefit from using it. Alternatively, the flash can be used at any ambient level if the user will set flash on.

In a next step 28, the white balance settings for the color correction/compensation of an image of an object taken with the flash are calculated (determined) using the following consideration. Basically in dark conditions, the camera can use fixed color gains optimized for the LED flash with no ambient light, and in a bright ambient light (the LED flash light level is much lower compared to the ambient light level, e.g., the object is at infinity) the camera can use AWB (auto white balance) gains. In mixed illumination conditions, the tuned color compensation gains for flash light are smoothly mixed between AWB and flash gains and, for example, for red component is given by:

$$RG\_flash = RG\_AWB - (dif*(RG\_AWB - RG\_flash\_tuned)) \quad (4),$$

wherein RG_flash_tuned is an optimised red color compensation gain for the flash light (no ambient light), RG_AWB is a red color compensation gain for the current ambient light type calculated by the AWB (no flash), e.g., from the viewfinder image, and Dif is given by $$Dif = E\_flash/(E\_flash + E\_ambient) \quad (5).$$

Equations 4 can be used for other colors as well, e.g., using RBG (red, blue, green) color gamut.

In a next step 30, the exposure settings for the images taken with the flash (for example, the exposure time of the image taken with the flash light) can be calculated as follows:

$$ES\_flash = AE\_target*A/[G\_flash*(E\_flash + E\_ambient)] \quad (6),$$

wherein AE_target is a target exposure level for the flash image which is usually the same for the flash as determined by the camera AE (e.g., using an exposure value EV setting etc.), and G_flash is a gain for the image taken with the flash; this gain refers to the gain (analog and/or digital) of all color channels for the image taken with the flash light. The selection of the G_flash depends on the scene and illumination, for example, in a "sport" scene, exposure time should be as short as possible so the gain for the flash image is typically higher, whereas in a "night" scene, the lower gain could be used (to get better image quality: the smaller the gain, the smaller the noise), and therefore the longer exposure time is then needed. It is noted that the exposure settings comprise both the exposure time of the image taken with the flash, ES_flash, and the gain for the image taken with the flash, G_flash. Then, alternatively (e.g., in a "night" mode), an exposure time ES_flash may be selected first and subsequently the gain G_flash, needed to get the required AE_target level, can be calculated using, e.g., Equation 6 in reverse as follows:

$$G\_flash = AE\_target * A / [ES\_flash * (E\_flash + E\_ambient)] \quad (7)$$

In a final step 32, the image of the object is taken by the camera with the flash light using at least one of the determined parameters, e.g., described by Equations 4, 6, and/or 7.

The embodiments of the present invention, as described above, can allow to improve image quality in cameras, especially with LED flash and when the object is in the close-up range. This also may result in a) longer battery life, because flash power consumption is minimized, b) improved LED life time (optimized LED "on" time, and/or c) decreased power consumption (optimized LED "on" time), etc.

Figure 2:
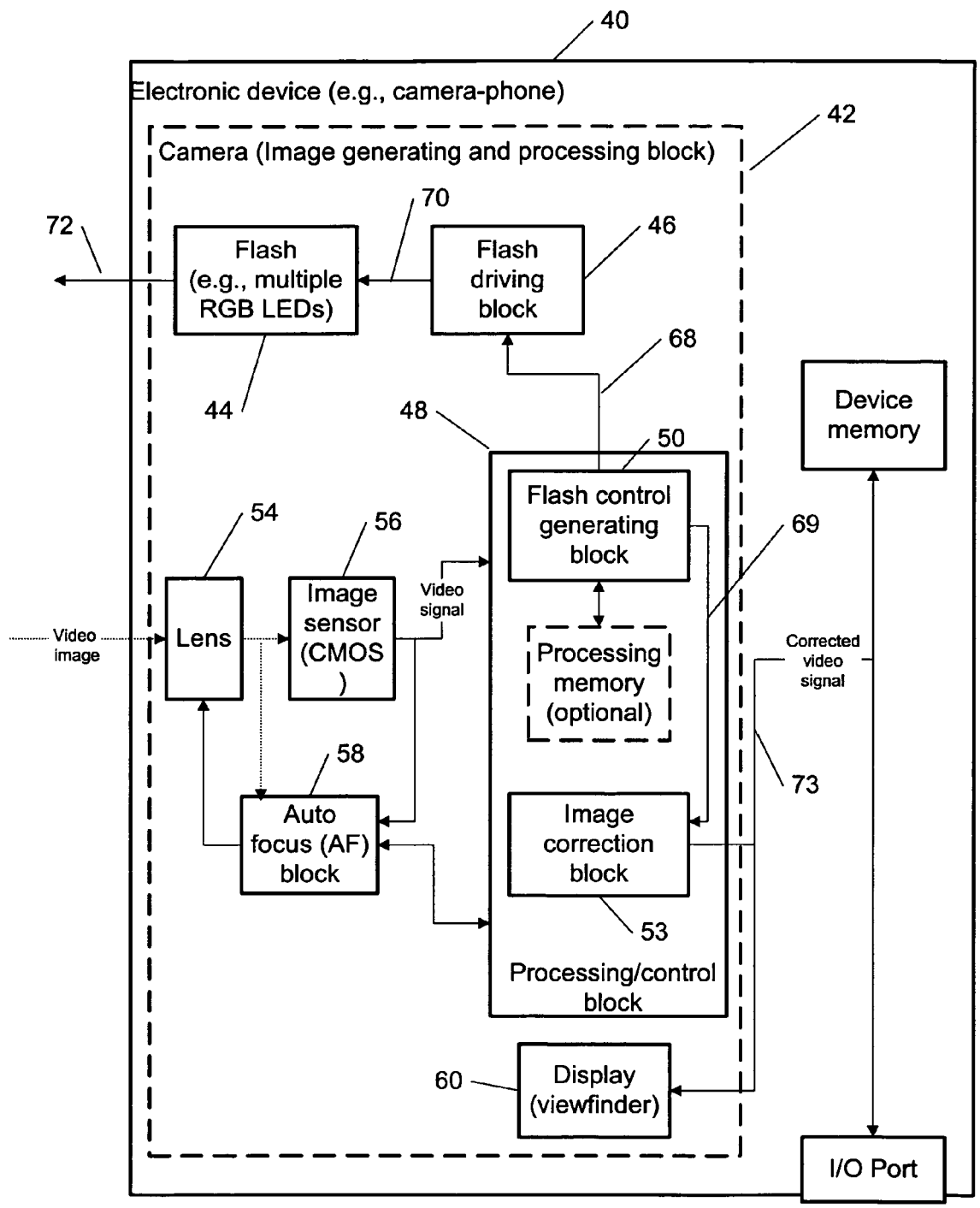
FIG. 2 is a block diagram of an electronic device comprising a camera for improving quality of images provided by the camera using a flash (e.g., multiple color LEDs), according to an embodiment of the present invention.

FIG. 2 shows an example among others of a block diagram of an electronic device 40 (e.g., a camera phone) comprising a camera (i.e., image generating and processing block) 42 for controlling a flash 44 (e.g., comprising multiple color LEDs) for improving quality of images provided by the camera 42, according to an embodiment of the present invention. The camera 42 can comprise a lens 54, an image sensor 56 (e.g., the CMOS sensor) for capturing the image of the object and/or ambient light, and a processing/control block 48. The camera 42 further can comprise the flash 44 (e.g., multiple color LEDs or other types of light sources), a flash driving block 46, auto focus block 58 and a display 60 (other blocks are not shown). The corrected video signal 73 from the camera 42 can be optionally stored in a device memory (or an external memory) or forwarded to a desired destination through the I/O port.

The block 48 can be a dedicated block in the camera module 42 or it can be incorporated within the processing block of the electronic device 40. The block 48 can comprise a flash control generating block 50 and a processing memory 52 and an image correction block 53. The block 50 can perform most calculation steps described in the flow chart of FIG. 1: for example steps 10, 22, 24, 26, 28 and/or 30. The block 50 can also provide the command signal 68 to the flash driving block 46 for performing the steps 14 and 32 of the flow chart of FIG. 1, wherein the block 46 provides the driving signal 70 to the LEDs of the block 44 (according to the instructions comprised in the signal 68), which generates the flash light signal 72. Also the block 50 can provide a signal 69, comprising information on the optimized color compensation gains with the flash (i.e., white balance settings) calculated in step 28, to the image correction block 53 for generating the corrected video signal 72 using the information on the optimized color compensation gains. The block 50 can also perform the logical operation, i.e., steps 12 and 18 of FIG. 1. The memory 52 can be used for assisting operations performed by the block 50 and for storing some tabulated data (e.g., "gray" reflectance level, E_a_ref, D_a_ref, G_flash) or other parameters which can be used by the block 50 for the appropriate calculations. The tabulated data and other parameters can be stored in an additional memory (not shown in FIG. 2).

The camera 42 can further comprise an auto focus block 58 (e.g., for performing step 16 of FIG. 1), a display (viewfinder) 60 and AE and AWB blocks which are not shown in FIG. 2.

According to an embodiment of the present invention, the block 58, 46, 48, AE or AWB can be implemented as a software or a hardware block or a combination thereof. Furthermore, the block 58, 46, 48, AE or AWB can be implemented as a separate block or can be combined with any other block of the electronic device 40 or it can be split into several blocks according to their functionality.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
   calculating an ambient light level;
   calculating an estimate of a flash light reflected from an object to be captured by a camera by calculating and using a distance from the camera to the object and using a value of an optical reflectance of the object, wherein said camera is configured to provide images using a flash;
   determining, using said ambient light level and said estimate of the flash light reflected from said object, at least one of the following parameters:
   color compensation gains for a color compensation of an image of the object taken with the flash,
   an exposure time of the image taken with the flash, and
   a gain for the image taken with the flash; and
   taking or processing the image of said object by the camera with said flash using at least one of said determined parameters.

2. The method of claim 1, wherein the ambient light level is calculated using a light level measured by a sensor of said camera, said sensor is used for providing the image of said object.

3. The method of claim 1, wherein
   said value of the optical reflectance of the object is calculated using stored values of a flash luminance at preselected distances from the camera to the object.

4. The method of claim 3, wherein said optical reflectance is a predetermined value substantially equal to 18%.

5. The method of claim 3, wherein said optical reflectance is measured using a further light level measured by a sensor of said camera, wherein said further light level measured by the sensor comprises the ambient light level and an assistance light level which is provided by the flash to perform an autofocusing procedure by the camera.

6. The method of claim 1, wherein said color compensation gains are determined using at least one of:
   an optimized color compensation gain for a particular color of the flash light without an ambient light, and an optimized color compensation gain for a particular color calculated by a camera auto white balance algorithm for the ambient light without the flash light.

7. The method of claim 1, wherein said exposure time of the flash is determined using at least one of:
a selected gain for the image taken with the flash, and
a target exposure level.

8. The method of claim 1, wherein said determined parameters comprise both the color compensation gains for the color compensation of the image of the object taken with the flash and the exposure time of the image taken with the flash.

9. A computer program product comprising: a computer readable storage structure embodying computer program code thereon for execution by a computer processor with said computer program code, wherein said computer program code comprises instructions for performing the method of claim 1.

10. An apparatus, comprising:
a flash control generating block, configured to calculate an ambient light level, configured to calculate an estimate of a flash light reflected from an object to be captured by a camera by calculating and using a distance from the camera to the object and using a value of an optical reflectance of the object, and configured to determine, using said ambient light level and said estimate of the flash light reflected from said object, at least one of the following parameters:
color compensation gains for a color compensation of an image of the object taken with a flash, and
an exposure time of the image taken with the flash, and
a gain for the image taken with the flash; and
a flash, configured to provide a flash light during taking said image.

11. The apparatus of claim 10, wherein said camera is digital.

12. The apparatus of claim 10, wherein the flash control generating block is configured to calculate the ambient light level using a light level measured by a sensor of said camera, said sensor is configured to provide the image of said object.

13. The apparatus of claim 10, wherein the flash control generating block is configured to calculate said value of the optical reflectance of the object is calculated using stored values of a flash luminance at pre-selected distances from the camera to the object.

14. The apparatus of claim 13, wherein said optical reflectance is a predetermined value substantially equal to 18%.

15. The apparatus of claim 13, wherein said apparatus is configured to measure the optical reflectance using a further light level measured by a sensor of said camera, wherein said further light level measured by the sensor comprises the ambient light level and an assistance light level which is provided by the flash to perform an auto-focusing procedure by the camera.

16. The apparatus of claim 10, wherein said flash control generating block is configured to determine the color compensation gains of the flash using at least one of:
an optimized color compensation gain for a particular color of the flash light without an ambient light, and
an ambient light gain for a particular color calculated by a camera auto white balance algorithm for the ambient light without the flash light.

17. The apparatus of claim 10, wherein said flash control generating block is configured to determine the exposure time of the flash using at least one of:
a selected flash gain, and
a target exposure level.

18. The apparatus of claim 10, wherein said flash comprises at least one light emitting diode.

19. The apparatus of claim 10, wherein said flash comprises multiple light emitting diodes of more than one color.

20. The apparatus of claim 10, wherein said apparatus is the camera, an electronic device, an electronic device comprising said camera, a wireless communication device, a mobile phone, a camera-phone mobile device or a portable electronic device.

21. The apparatus of claim 10, further comprising:
an image correction block, configured to compensate the color of the image of the object taken with the flash using said color compensation gains thus providing a corrected video signal.

22. The apparatus of claim 10, wherein said determined parameters comprise both the color compensation gains for the color compensation of the image of the object taken with the flash and the exposure time of the image taken with the flash.

23. An apparatus, comprising:
means for calculating an ambient light level;
means for calculating an estimate of a flash light reflected from an object to be captured by a camera comprised in said apparatus;
means for determining, using said ambient light level and said estimate of the flash light reflected from said object, at least one of the following parameters:
color compensation gains for a color compensation of an image of the object taken with a flash,
an exposure time of the image taken with the flash, and
a gain for the image taken with the flash; and
means for taking or processing the image of said object by the camera with said flash using at least one of said determined parameters.

* * * * *